(12) United States Patent
Xie et al.

(10) Patent No.: US 8,866,775 B2
(45) Date of Patent: Oct. 21, 2014

(54) TOUCH PANEL

(75) Inventors: Yanjun Xie, Wuhan (CN); Yau-Chen Jiang, Zhubei (TW); Bin Lai, Fuzhou (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 246 days.

(21) Appl. No.: 13/585,809

(22) Filed: Aug. 14, 2012

(65) Prior Publication Data

US 2013/0105291 A1    May 2, 2013

(30) Foreign Application Priority Data

Oct. 27, 2011 (CN) .......................... 2011 1 0355623

(51) Int. Cl.
*G06F 3/041* (2006.01)
(52) U.S. Cl.
USPC .......................................................... 345/173
(58) Field of Classification Search
USPC ................................................. 345/173–178
See application file for complete search history.

(56) References Cited

U.S. PATENT DOCUMENTS

2005/0270273 A1    12/2005   Marten

FOREIGN PATENT DOCUMENTS

CN           101819483 A      9/2010

*Primary Examiner* — Jeremy C Norris
(74) *Attorney, Agent, or Firm* — Gokalp Bayramoglu

(57) ABSTRACT

The present disclosure relates to an input interface and particularly to a novel touch panel which includes a plurality of first axial electrodes and a plurality of second axial electrodes. Each of the first axial electrodes is extended in a first direction. Each of the first axial electrodes includes a plurality of first inductive electrodes, a plurality of second inductive electrodes, and a plurality of first connecting lines. The first inductive electrodes and the second inductive electrodes are disposed alternatively along a first direction. Each of the first connecting lines is disposed between the first inductive electrodes and the second inductive electrodes. Each of the second axial electrodes is extended in a second direction. Each of the second axial electrodes has a plurality of hollow areas arranged along the second direction, and each of the first inductive electrodes is disposed within said hollow areas.

11 Claims, 4 Drawing Sheets

TOUCH PANEL

BACKGROUND OF THE INVENTION

This Application claims the benefit of the People's Republic of China Application No. 201110355623.7, filed on Oct. 27, 2011.

FIELD OF THE INVENTION

The present disclosure relates to an input interface and more particularly to a touch panel.

DESCRIPTION OF THE RELATED ART

In recent years, more and more products having a touch function integrated with a display to form a touch display panel have been made available, some of which include mobile phone, navigator system, tablet PC, PDA and laptop PC. At present, a number of touch panel techniques are available and common techniques in portable small-sized electronic devices include resistive touch panels and capacitive touch panels among others, whose operation principle is to use transparent inductive electrodes for detecting voltage or capacitive changes in touch point positions and use linkage lines connecting various transparent inductive electrodes in different axial directions for transmitting signals back and finishing the orientation.

In touch panel technology, designs of inductive electrodes are of many kinds. Wherein one type of electrodes employs an inductive pad of diamond pattern to line up the various inductive electrodes in the same axial direction by means of the linkage lines. Also, the electrode design of mutually vertical stripe patterns is adopted to form an inductive area by taking, advantage of overlapped area.

However, regular stripe arrangements of the inductive electrodes are likely to cause drawbacks of the visual effects while being collocated with the display panel. In other words, patterns of the touch panel can he designed so as to influence normal display effect of the display panel. Further, in regular stripe arrangements, the condition will become even worse, especially When the pattern of the strip inductive electrodes and the strip color area of the display panel are mutually parallel in an arrangement. Therefore, there is a need to improve the design of the electrode shapes.

SUMMARY OF THE INVENTION

An objective of the present disclosure is to provide a touch panel that sets a partial area of one axial electrode in an empty structure of another axial electrode, and reduces the influence caused by fine strip patterns of various axial electrodes over the exterior quality, thereby improving the exterior quality of the touch panel.

In view of the foregoing purpose, another embodiment of the present disclosure provides a touch panel that includes a plurality of first axial electrodes and a plurality of second axial electrodes. The first axial electrodes are extended towards a first direction. The first axial electrodes include a plurality of first inductive electrodes, plurality of second inductive electrodes, and plurality of first linkage lines. The first inductive electrodes and the second inductive electrodes are set alternatively along a first direction, while the first linkage lines are respectively set between the adjacent first inductive electrodes and the adjacent second inductive. electrodes, and electrically connected to the first inductive electrodes and the second inductive electrodes in the same wire of the first axial electrodes. The second axial electrodes are extended toward a second direction. The second axial electrodes posses a plurality of empty spaces aligned along the second direction where the various first inductive electrodes are set.

BRIEF DESCRIPTION OF THE DRAWINGS

For those skilled in the art to understand the present disclosure, numerous embodiments are described below, annexing drawings to minutely illustrate the matters of the present disclosure and the purpose thereof.

DETAILED DESCRIPTION OF THE EMBODIMENTS

Certain vocabularies and phrases are used for pointing out specific components in the present specification and the subsequent patent applications. The belonged field possesses the same components possibly described by the manufacturers with the different nouns and usually understood by the learners. The specification and its subsequent patent applications do not take the name diversity as the method of distinguishing the components, but take the functional variety as the distinguishing benchmark. The "include" mentioned in the whole specification and the subsequent request articles is an open phrase, and therefore is accounted for "includes but not restricted to". Moreover, in order to make the ordinary technicians acquainted with the technical field belonging to this disclosure more explicitly, the following context particularly cites several favorable embodiments of this invention coupled with the attached schema for explicitly illustrating the constituent contents of this disclosure. Please note that the schema only takes the illustration as the objective and does not make the drawings according to the original dimensions. In addition, the terms such as "the first" and "the second" used in the context, are only used for distinguishing the different components, and not restricted to the generation order.

Figure 1:
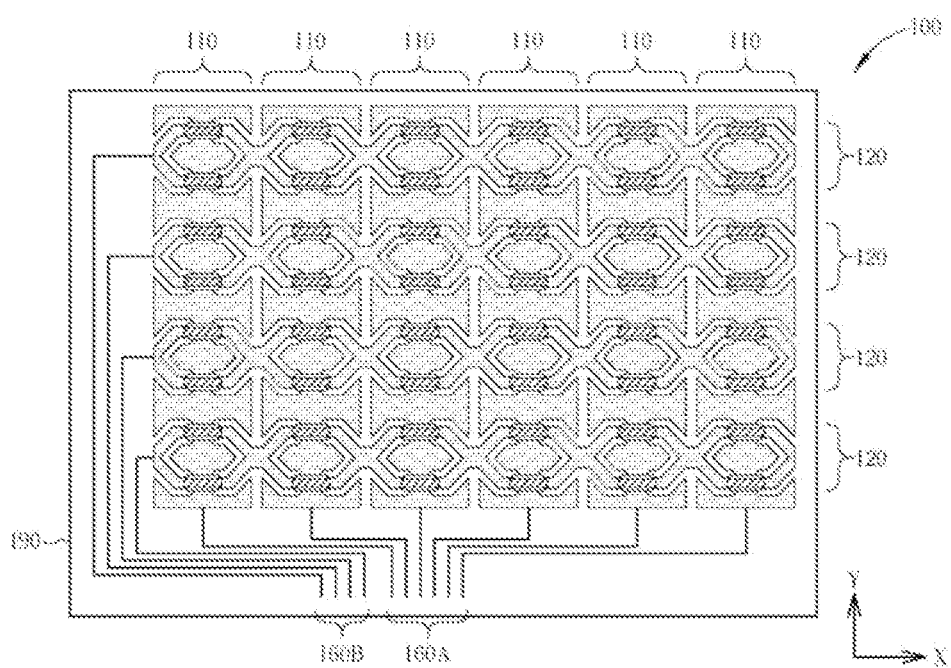
FIGS. 1-4 illustrate diagrams of a touch panel in an embodiment of the present disclosure.
Figure 2:
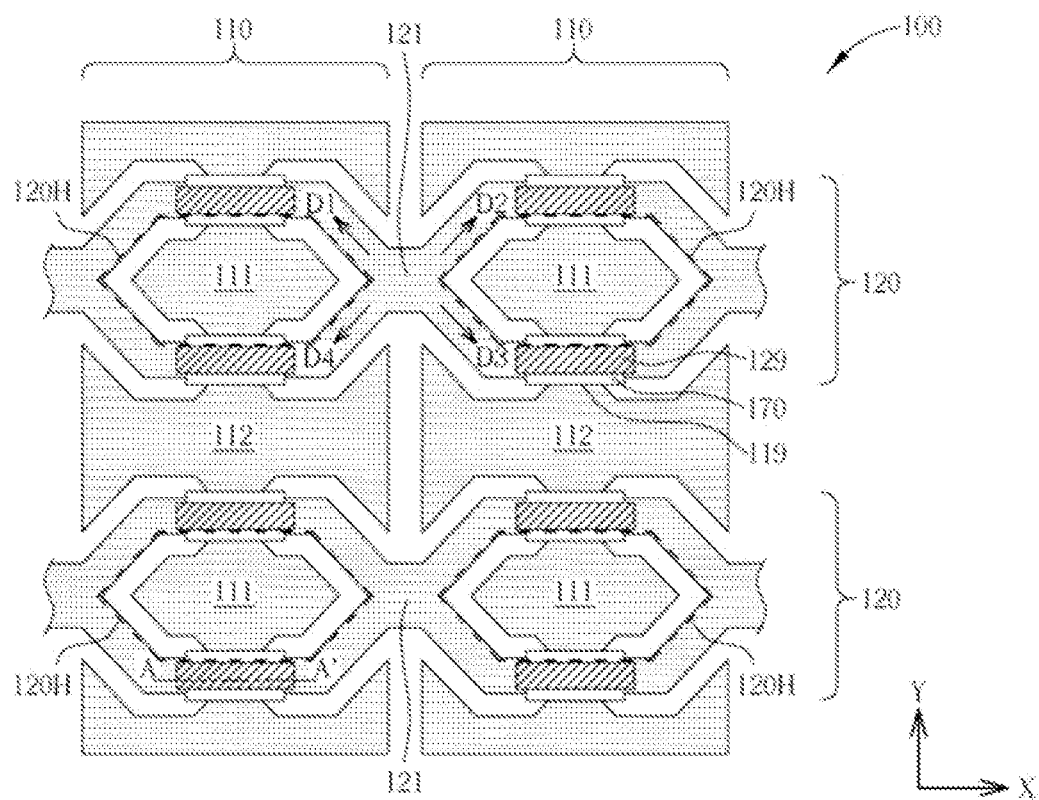
Figure 3:
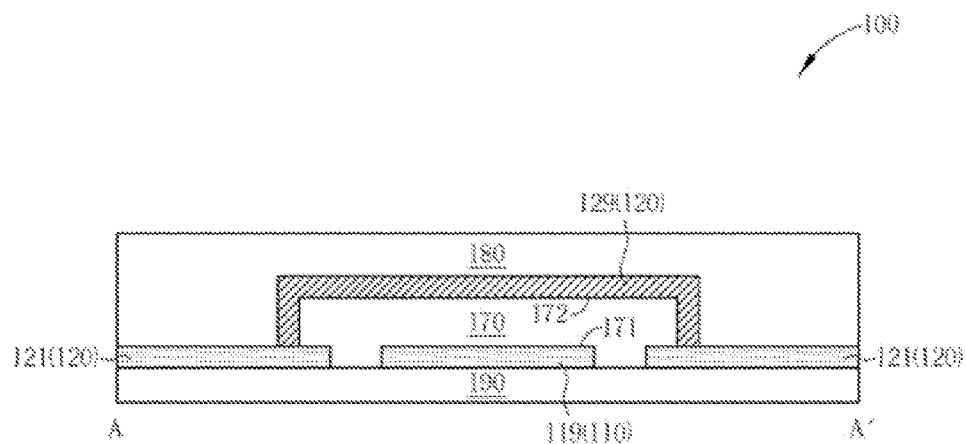
Figure 4:
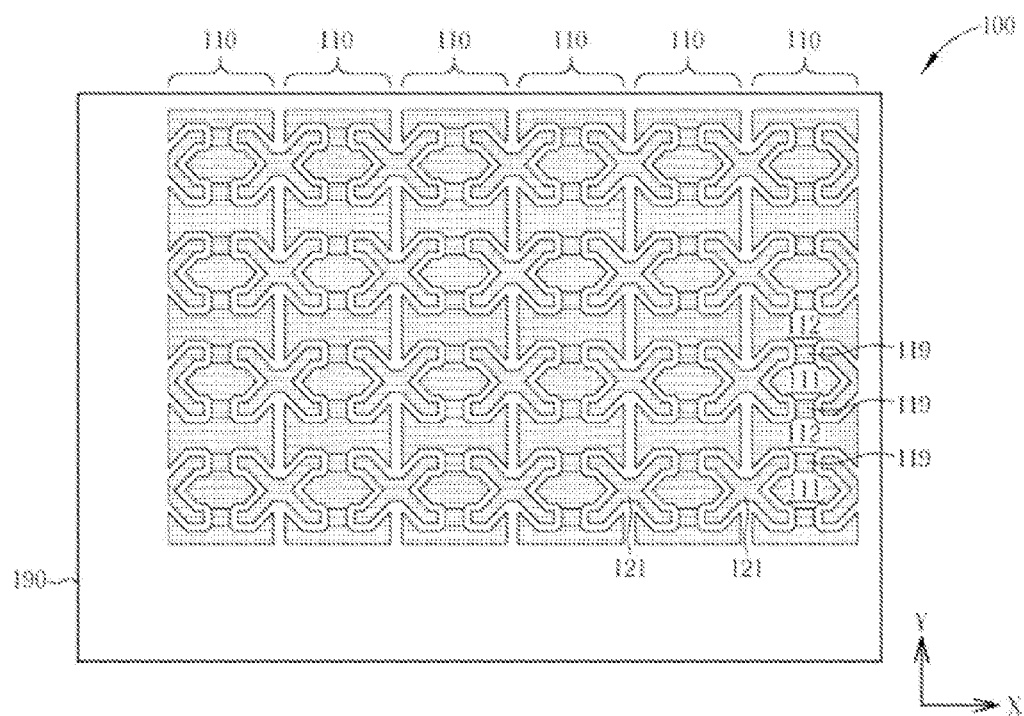

FIGS. 1-4 illustrate a touch panel in an embodiment of the present disclosure, wherein FIG. 1, FIG. 2 and FIG. 4 are the top views, and FIG. 2 is the schematic diagram of FIG. 1 partially amplified, and FIG. 3 is the cross-sectional schematic diagram of A-A' hatching lines in FIG. 2, and FIG. 4 is the schematic diagram of the simplified transparent areas in FIG. 1. In order to make the illustrations easy, various schemas of the present disclosure are shown only for demonstrations and to understand the disclosure more easily, wherein detailed proportions can be modulated according to the design requirements. As shown in FIGS. 1-4, in an embodiment of the present disclosure, a touch panel 100 includes a substrate 190, a plurality of first axial electrodes 110, and a plurality of second axial electrodes 120. The substrate 190 can include hard substrates such as glass substrates, ceramic substrates or flexible substrates such as plastic substrates and other substrates formed by other suitable materials. The first axial electrodes 110 are disposed on the substrate 190 and extended toward a first direction Y. The first set of axial electrodes 110 include a plurality of first inductive electrodes 111, a plurality of second inductive electrodes 112, and a plurality of the first linkage lines 119. The first inductive electrodes 111 and the second inductive electrodes 112 are set alternatively along the first direction Y, whereas the first linkage lines 119 are respectively set between the adjacent first inductive electrodes 111 and between the adjacent second inductive electrodes 112, being electrically connected to the first inductive electrodes 111 and the second inductive electrodes 112 in the same wire of the first axial electrodes 110. The second axial electrodes 120 are disposed on the substrate 190 and extended toward a second direction X. The second axial electrodes 120 possess a plurality of empty spaces 120H aliped along the second direction X. where the first inductive electrodes 111 are set. Moreover, the second axial electrodes 120 further include a plurality of third inductive electrodes 121 set along the second direction X and a plurality of second linkage lines 129 that are respectively set between the third inductive electrodes 121 and electrically connected to the third inductive electrodes 121 in the same wire of the second axial electrodes 120.

Further, the adjacent third inductive electrodes 121 in the second direction X are electrically linked together by means of two second linkage lines 129 that can promote the reliability of the touch panel 100. Moreover, the various third inductive electrodes 121 in the present embodiment can include an electrode-crossing pattern and possess an extension direction an extension direction D2, an extension direction D3 and an extension direction D4. And these extension directions are not paralleled to or perpendicular to the first direction Y and the second direction X. Therefore, even if the electrode-crossing pattern of the third inductive electrodes 121 still possesses the fine strip portion, the extension direction of this fine strip pattern is not paralleled to or perpendicular to the first direction Y and the second direction X and thus, will not influence over the exterior quality of the touch panel.

In an embodiment of the present disclosure, first axial electrodes 110 and third inductive electrodes 121 can be formed by same conductive material. The foregoing conductive materials can include transparent conductive materials such as 110, 170 and AZO or other suitable non-transparent conductive materials such as silver, aluminum, copper, magnesium and molybdenum, and composite layer or the alloy composed of such materials, but is not limited thereto. In an embodiment of the present disclosure, the first inductive electrodes 111 are set between two adjacent third inductive electrodes 121 in the second direction X, and the first inductive electrodes 111 are set between two adjacent second inductive electrodes 112 in the first direction Y More explicitly, central points of the first inductive electrodes 111 and the second inductive electrodes 112 of the various first axial electrodes 110 are situated in the same straight line, and central points of the various first inductive electrodes 111 and two adjacent third inductive electrodes 121 are situated in the same straight line, but this configuration is not limited only to this in any manner and all other possible arrangements are also possible. In other words, density of the inductive electrodes can be increased by means of the pattern design of the inductive electrodes, which can improve the touch resolution and sensibility.

In an embodiment of the present disclosure, a touch panel 100 can further include a plurality of first conductive lines 160A and a plurality of second conductive lines 160B, which are respectively in the electrical connection with the first axial electrodes 110 and the second axial electrodes 120. The first conductive lines 160A, the second conductive lines 160B, and second linkage lines 129 can be formed by same conductive material so as to reduce the manufacturing process. The foregoing conductive materials can include transparent conductive materials such as ITO, IZO and AZO or other suitable non-transparent conductive materials such as silver, aluminum, copper, magnesium and molybdenum, and composite layer or the alloy composed of such materials, but this configuration is not limited only to this in any manner and all other possible arrangements are also possible. In addition, as shown in FIG. 2 and FIG. 3, the touch panel 100 in the present embodiment can further include an insulation layer 170 and a cover layer 180. The insulating layer 170 is set between various first linkage lines 119 and between various second linkage lines 129. Which is used for preventing mutual interference between the signals. In an embodiment of the present disclosure, the first linkage lines 119 and the third inductive electrodes 121 can be formed first by same conductive material on the substrate 190, and then the insulation layer can he formed next, and therefore the first linkage lines 119 can be set between the substrate 190 and a first side 171 of the insulation layer 170, whereas the second linkage lines 129 can he set on a second side 172 of the insulation layer 170. In an embodiment, the second linkage lines 129 can first be formed on the substrate 190, after which the insulation layer 170 be formed, and finally the first linkage lines 119 can be formed in sequence, thereby setting the second linkage lines 129 between the substrate 190 and the first side 171 of the insulation layer 170. The first linkage lines 119 can also be set on the second side 172 of the insulation layer 170. In addition, the cover layer 180 set on the substrate 190 is used for covering the first axial electrodes 110, the second axial electrodes 120, and the insulation layer 170. Materials of the insulation layer 170 and the cover layer 180 can respectively include the inorganic materials such as silicon nitride, silicon oxide and silicon oxynitride, and the organic materials such as acrylic resin, polyimide or other suitable materials.

Figure 5:
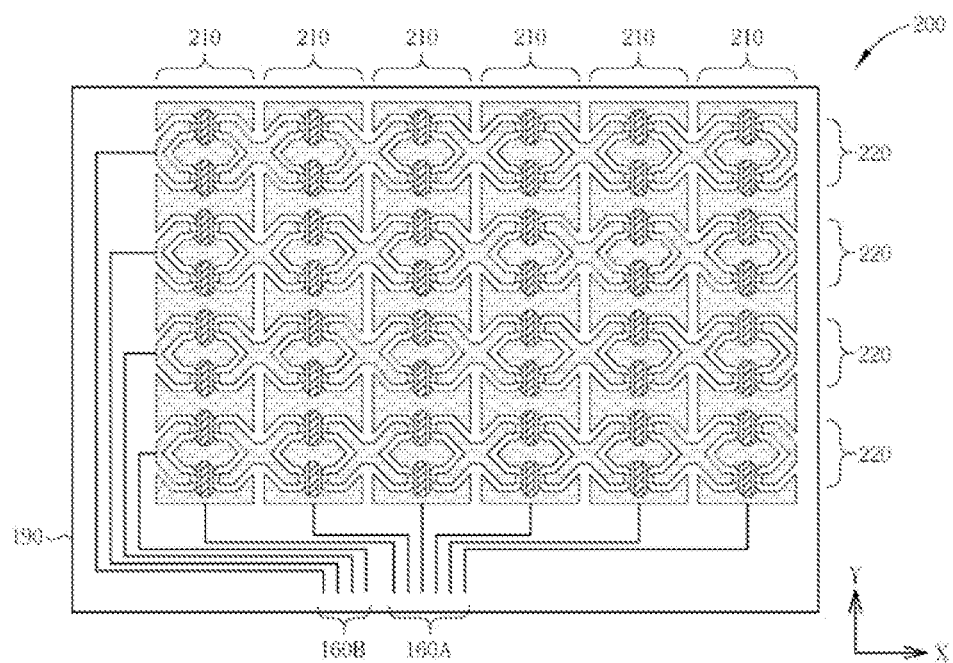
FIGS. 5-8 illustrate diagrams of a touch panel in another embodiment of the present disclosure.
Figure 6:
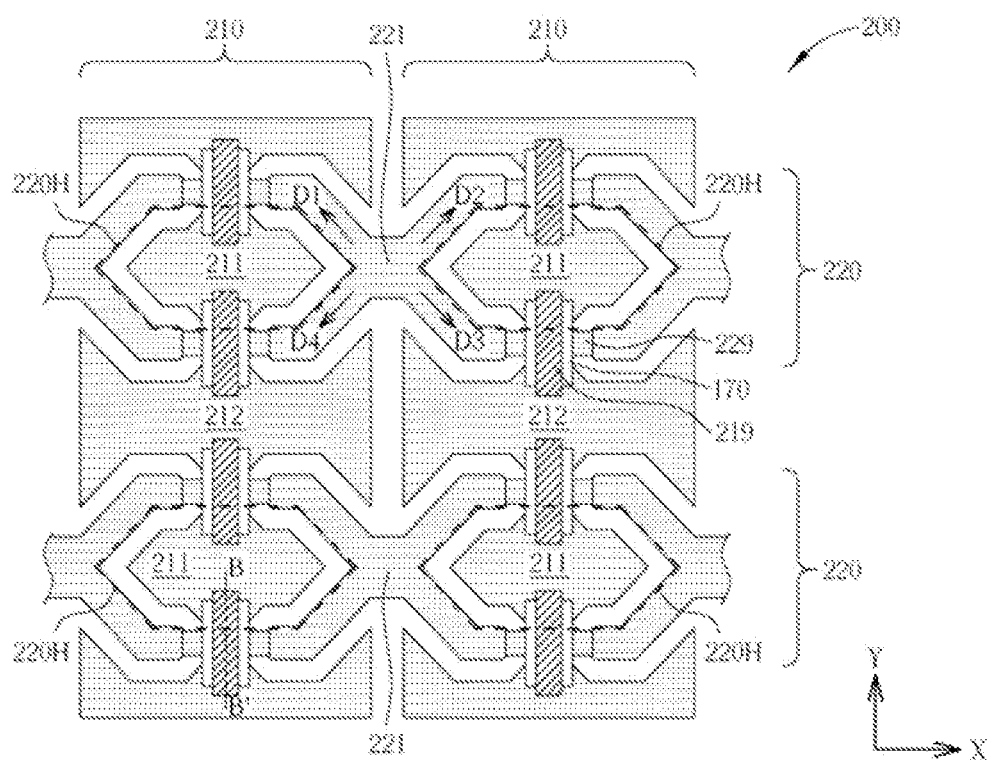
Figure 7:
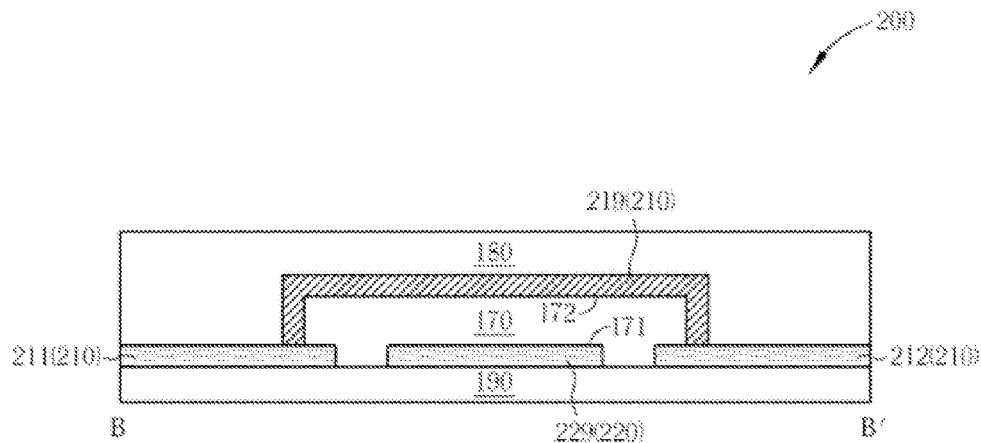
Figure 8:
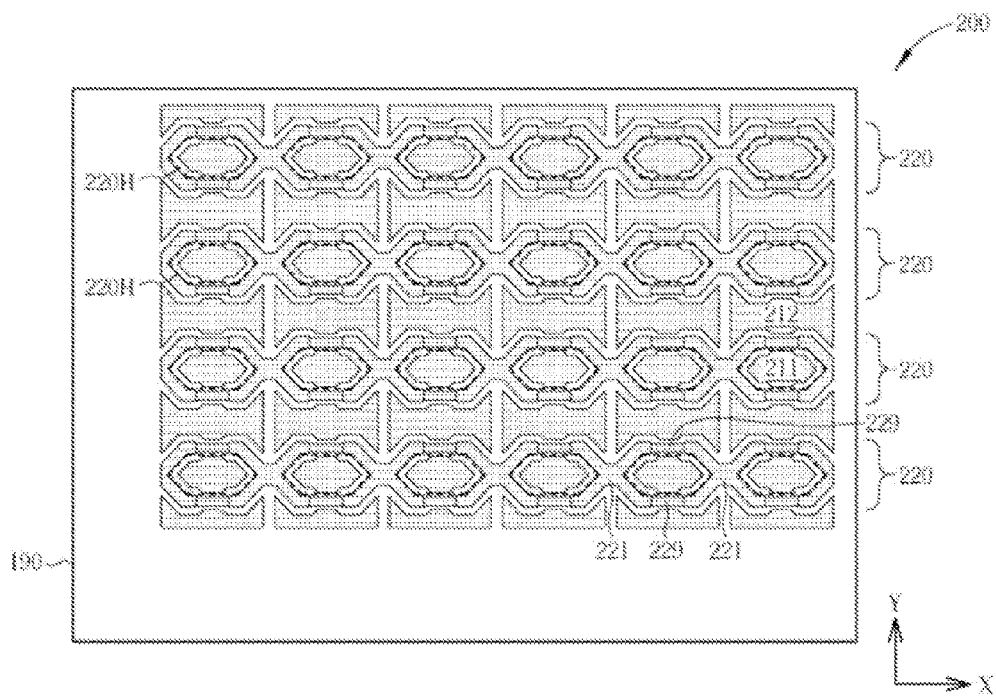

FIGS. 5-8 illustrate a touch panel in another embodiment of the present disclosure, Wherein FIG. 5, FIG. 6 and FIG. 8 are the top views, FIG. 6 is the partially amplified schematic diagram of FIG. 5, FIG. 7 is the cross-sectional schematic diagram of B-B' hatching line of FIG. 6, and FIG. 8 is the simplified schematic diagram of the transparent areas in FIG. 5. As shown in FIGS. 5-8, a touch panel 200 includes a substrate 190, a plurality of first axial electrodes 210, a plurality of second axial electrodes 220, a plurality of first conductive lines 160A, and a plurality of second conductive lines 160B. The first axial electrodes 210 set on the substrate 190 are extended toward a first direction Y The first axial electrodes 210 include a plurality of first inductive electrodes 211, a plurality of the second inductive electrodes 212, and a plurality of first linkage lines 219. The first inductive electrodes 211 and the second inductive electrodes 212 are set alternatively along the first direction Y and the first linkage lines 219 are respectively set between the adjacent first inductive electrodes 211 and between the adjacent second inductive electrodes 212, which are electrically connected to the first inductive electrodes 111 and the second inductive electrodes 212 in the same wire of the first axial electrodes 210. The second axial electrodes 220 are set on the substrate 190 and extended towards a second direction X. The various second axial electrodes 220 possess a plurality of empty spaces aligned along the second direction X where the various first inductive electrodes 211 are set. In addition. the various second axial electrodes 220 can further include a plurality of third inductive electrodes 221 set along the second direction X and a plurality of second linkage lines 229. The second linkage lines 229 are respectively set between two adjacent third inductive electrodes 221, being electrically connected to the third inductive electrodes 221 in the same wire of the second axial electrodes 220. The various component features and material properties of the touch panel 200 in the present embodiment are similar to those of the touch panel 100 in the above mentioned embodiment, and therefore not restated. In an embodiment of the present disclosure, the various second axial electrodes 220, the various first inductive electrodes 211, and the various second inductive electrodes 212 can be composed of same conductive material. With reference to FIG. 8, the various first conductive lines 160A, the various second conductive lines 160B, and the various first linkage lines 219 can be composed of same conductive material to simplify the manufacturing process of the touch panel.

In an embodiment of the present disclosure, as shown in FIGS. 6-7, the second linkage lines 229, the first inductive electrodes 211, and the second inductive electrodes 212 can be formed by the same conductive material on the substrate 190 first and then, the insulation layer 170 can be formed later, therefore, the second linkage lines 229 can be set between the substrate 190 and a first lateral side 171 of the insulation layer 170, Whereas the first linkage lines 219 can be set on a second lateral side 172 of the insulation layer 170. However, the present disclosure is not restricted to this embodiment. In an embodiment, the first linkage lines 219 is first formed on the substrate 190 and subsequently the insulation layer 170 and the second linkage lines 229 are formed. Therefore, the first linkage lines 219 can be set between the substrate 190 and the first lateral side 171 of the insulation layer 170, and the second linkage lines 229 can be set on the second lateral side 172 of the insulation layer 170. Moreover, the cover layer 180 set on the substrate 190 is used for covering the first axial electrodes 210, the second axial electrodes 220, and the insulation layer 170.

In an embodiment of the present disclosure, a touch panel of the present disclosure makes use of setting partial inductive electrodes of one axis in an empty structure of another electrode axis for improving simultaneously the exterior quality, the touch resolution, and the sensibility. In addition, the touch panel of the present disclosure further increases the number of linkage lines between adjacent inductive electrodes to reach the effect of promoting the touch panel reliability.

While certain embodiment have been shown and described, various modifications and substitutions may be made thereto without departing from the spirit and scope of the present disclosure. Therefore, it is to be understood that the present disclosure has been described by way of illustration and not limitations.

What is claimed is:

1. A touch panel, comprising:
a plurality of first axial electrodes extended in a first direction, wherein said first axial electrodes further comprise a plurality of first inductive electrodes, a plurality of second inductive electrodes, and a plurality of first linkage lines, wherein said first inductive electrodes and said second inductive electrodes are set alternatively along said first direction, and wherein the first linkage lines are respectively set between the adjacent first inductive electrodes and between the adjacent second inductive electrodes, wherein the second inductive electrodes are electrically connected to the first inductive electrodes; and a plurality of second axial electrodes extended in a second direction, wherein the second axial electrodes possess a plurality of empty areas aligned along said second direction where the first inductive electrodes are set.

2. The touch panel of claim 1, wherein the second axial electrodes further comprise a plurality of third inductive electrodes set along said second direction and a plurality of second linkage lines, wherein said second linkage lines are respectively set between said two adjacent third inductive electrodes electrically connected to said third inductive electrodes in said wire of said second axial electrodes.

3. The touch panel of claim 2, wherein the two adjacent third inductive electrodes in the second direction are electrically connected by means of at least said two second linkage lines.

4. The touch panel of claim 2, wherein the third inductive electrodes comprise an electrode-crossing pattern.

5. The touch panel of claim 2, wherein the third inductive electrodes possess at least an extending direction not parallel to or perpendicular to the first direction and the second direction.

6. The touch panel of claim 2, wherein the first inductive electrodes are set between the two adjacent third inductive electrodes in said second direction, and further set between the two adjacent second inductive electrodes in said first direction.

7. The touch panel of claim 2, further comprising a substrate and an insulation layer, wherein the first axial electrodes and the second axial electrodes are set on the said substrate, and wherein the insulation layer is set between the first linkage lines and between the second linkage lines.

8. The touch panel of claim 7, wherein the first linkage lines are set between the substrate and a first lateral side of the insulation layer, and Wherein the second linkage lines are set on a second lateral side of said insulation layer.

9. The touch panel of claim 7, wherein the second linkage lines are set between the substrate and a first lateral side of the insulation layer, and wherein the first linkage lines are set on a second lateral side of the insulation layer.

10. The touch panel of claim 1, further comprising a cover layer for covering said first axial electrodes and said second axial electrodes.

11. The touch panel of claim 1, further comprising a plurality of first conductive wires and a plurality of second conductive wires, wherein said first conductive wires and said second conductive wires are electrically connected with the first axial electrodes and the second axial electrodes.

* * * * *